United States Patent
Wiertlewski et al.

(10) Patent No.: US 9,298,259 B2
(45) Date of Patent: Mar. 29, 2016

(54) SYSTEM FOR SIMULATING A CONTACT WITH A SURFACE BY TACTILE SIMULATION

(75) Inventors: Michaël Wiertlewski, Paris (FR); Vincent Hayward, Paris (FR); José Lozada, Massy (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE PIERRE ET MARIE CURIE, Paris (FR)

( * ) Notice: Subject to any disclaimer, the term of this patent is extended or adjusted under 35 U.S.C. 154(b) by 561 days.

(21) Appl. No.: 13/808,386

(22) PCT Filed: Jul. 4, 2011

(86) PCT No.: PCT/EP2011/061184
§ 371 (c)(1),
(2), (4) Date: Jan. 31, 2013

(87) PCT Pub. No.: WO2012/004214
PCT Pub. Date: Jan. 12, 2012

(65) Prior Publication Data
US 2013/0151960 A1    Jun. 13, 2013

(30) Foreign Application Priority Data
Jul. 6, 2010   (FR) ..................... 10 55479

(51) Int. Cl.
*H04B 3/36*    (2006.01)
*G06F 3/01*    (2006.01)
(Continued)

(52) U.S. Cl.
CPC ............... *G06F 3/014* (2013.01); *G06F 3/015* (2013.01); *G06F 3/016* (2013.01); *G06F 3/0338* (2013.01); *G06F 3/03548* (2013.01)

(58) Field of Classification Search
CPC ........... G08B 6/00; G06F 3/011; G06F 3/014; G06F 3/015; G06F 3/016; G06F 3/0338; G06F 3/03548; G06F 3/0488
USPC ............................................ 340/407.1, 407.2
See application file for complete search history.

(56) References Cited

U.S. PATENT DOCUMENTS 5,583,478 A    12/1996   Renzi
6,275,213 B1    8/2001   Tremblay
(Continued)

FOREIGN PATENT DOCUMENTS

| CN | 2725994 Y | 9/2005 |
|---|---|---|
| JP | 2002-040927 A | 2/2002 |
| JP | 2005-100179 A | 4/2005 |

OTHER PUBLICATIONS

Rober Scheibe et. al. "Tactile Feedback at the Finger Tips for Improved Direct Interactionin Immersive Environments", IEEE Virtual Reality Conference 2007, Charlotte North Carolina, USA Mar. 2007.

(Continued)

*Primary Examiner* — Eric Blount
(74) *Attorney, Agent, or Firm* — Pearne & Gordon LLP

(57) ABSTRACT

A system for simulation of a contact with a surface by tactile stimulation including a surface that will come into contact with the digital pulp of a user's finger. The system includes means of displacing the surface along first and second directions (X, Y) orthogonal to each other and approximately tangent to the digital pulp of the finger. The displacement means are controlled as a function of the simulation to be generated, in which the displacement means are electromagnetic actuators.

32 Claims, 6 Drawing Sheets

(51) Int. Cl.
*G06F 3/0338* (2013.01)
*G06F 3/0354* (2013.01)

(56) References Cited

U.S. PATENT DOCUMENTS

| | | | |
|---|---|---|---|
| 6,747,631 B1 | 6/2004 | Sakamaki | |
| 6,982,696 B1 * | 1/2006 | Shahoian | 345/156 |
| 8,013,847 B2 * | 9/2011 | Anastas | 345/184 |
| 8,077,165 B2 * | 12/2011 | Sakurai et al. | 345/184 |
| 8,610,548 B1 * | 12/2013 | Provancher | 340/407.1 |
| 8,803,795 B2 * | 8/2014 | Grant et al. | 345/156 |
| 8,830,161 B2 * | 9/2014 | Grant et al. | 345/156 |
| 2001/0035854 A1 * | 11/2001 | Rosenberg et al. | 345/156 |
| 2004/0104887 A1 * | 6/2004 | Tsukamoto et al. | 345/156 |
| 2004/0252104 A1 * | 12/2004 | Nakamura et al. | 345/160 |
| 2006/0022952 A1 | 2/2006 | Ryynanen | |
| 2006/0115348 A1 | 6/2006 | Kramer | |
| 2009/0036212 A1 | 2/2009 | Provancher | |
| 2009/0278798 A1 | 11/2009 | Kim | |
| 2010/0108408 A1 | 5/2010 | Colgate | |

OTHER PUBLICATIONS

Kouta Minamizawa et. al. "A Wearable Haptic Display to Present the Gravity Sensation-Preliminary Observations and Device Design" Second Joint EuroHaptics Conference and Symposium on Haptic Interfaces for Virtual Environment and Teleoperator Systems, 2007 IEEE.

B. Shimoga et. al. "A survey of Perceptual Feedback Issues in Dexterous Telemanipulation: Part 1: Finger Force Feedback" The Robotics Institute Carenegie Mellon University, Virtual Reality Annual International Symposium 1993.

International Search Report, PCT/EP2011/061184, dated Mar. 27, 2012.

Preliminary Search Report, FR 1055479, dated Jan. 31, 2011.

Office Action issued in corresponding Chinese Patent Application No. 201180042783.4 dated Mar. 31, 2015.

* cited by examiner

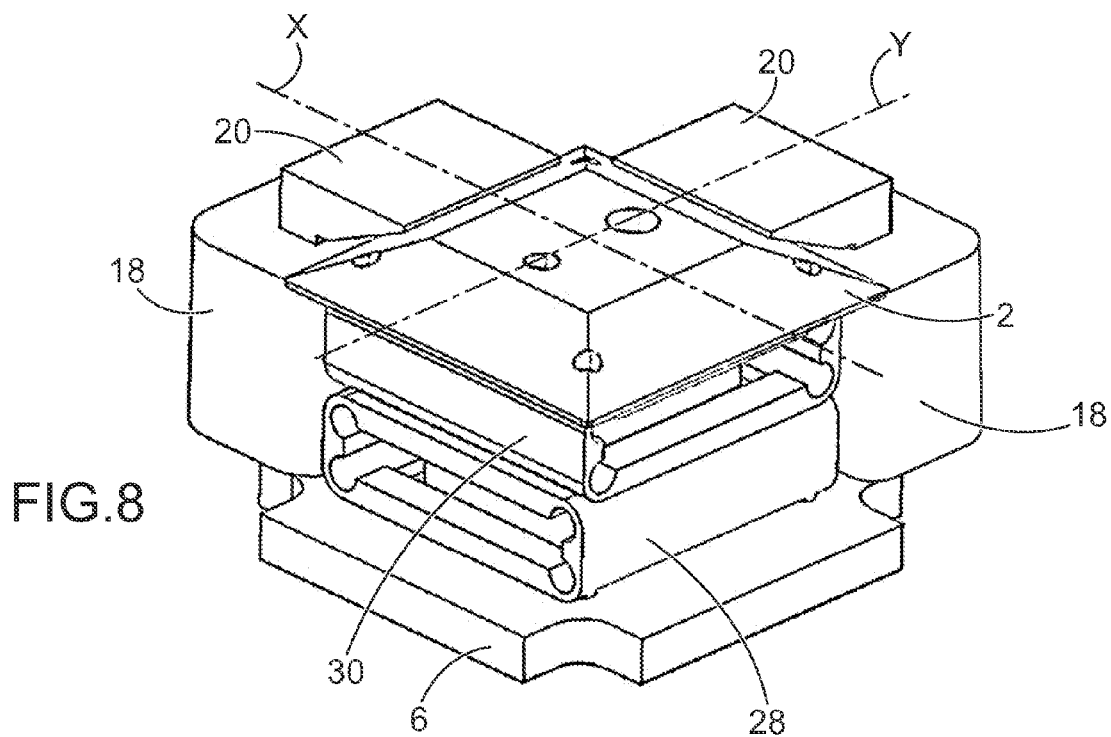
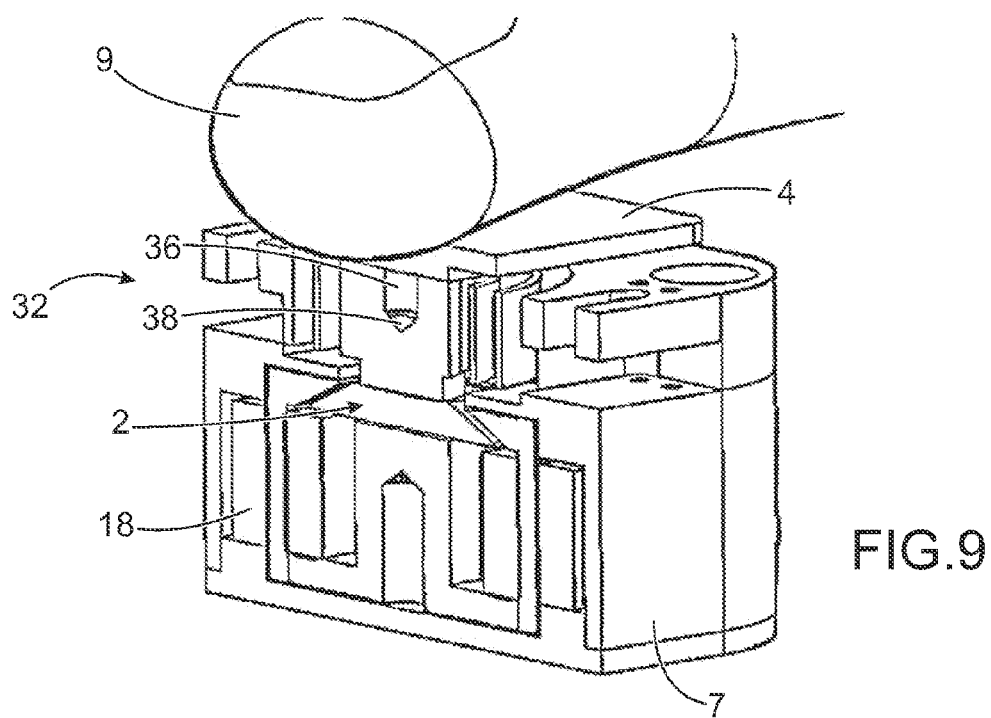

SYSTEM FOR SIMULATING A CONTACT WITH A SURFACE BY TACTILE SIMULATION

TECHNICAL FIELD AND PRIOR ART

This invention relates to a system for simulating a contact with a surface by tactile stimulation, for example to simulate roughness or gripping of an object, designed for example for use as a tactile interface in the virtual reality domain or as a sensorial interface in various domains such as transport, telephony, data processing, etc.

Document US2009/0036212 discloses a system to provide tactile information. The system is provided with a surface free to move along two directions that will generate shear forces on the digital pulp of the fingers and providing information about the direction. However, this type of system is incapable of generating a true sensation of texture, and it cannot simulate surface roughness.

There are also virtual reality gloves. One such type of gloves is disclosed in document U.S. Pat. No. 6,275,213. It comprises vibrators at the ends of the fingers. When it is required to simulate a finger coming into contact with a virtual object, the vibrator is actuated and causes a single frequency vibration at the finger concerned. However, this information is only metaphoric and does not provide the user with a realistic feeling.

There are also systems like that disclosed in document U.S. Pat. No. 5,583,478, comprising pins stimulating the digital pulp of the fingers by indentation.

However, for example local stimulation cannot correctly simulate gripping of objects.

Consequently, one purpose of this invention is to disclose a system for simulation of a contact with a surface by tactile stimulation providing a realistic sensation for the user.

PRESENTATION OF THE INVENTION

The previously mentioned purpose is achieved by a system comprising a surface with which an area of the user's skin will come into contact, said surface being movable along at least one direction, advantageously two directions orthogonal to each other such that they generate shear forces along the one direction or two directions at the area of the skin.

Furthermore, the system comprises electromagnetic actuators to move said surface along the direction or along orthogonal directions, capable of providing a high stimulation frequency so that dynamic interactions of feel, for example the texture of a surface, can be realistically retranscribed. The system according to this invention is then capable of generating a very high quality rendering of the tactile texture of a surface.

For example, the actuators are capable of outputting a stimulation frequency of between 0 Hz and 1200 Hz.

In other words, the electromagnetic actuators enable a very fast refreshment of the stimulation applied to an area of the skin through displacement of the stimulation surface, so that a modification to the texture of a surface can be simulated particularly realistically.

In one particular embodiment, the surface can also be moved along an axis orthogonal to the surface, thus applying a force normal to the skin area and oriented so as to deform it. The system can then generate a local stimulation by indentation. Gripping of objects by hand can then be simulated, the area of skin is then for example the digital pulp of the fingers and the system is then designed for at least two fingers. A squeezing force is simulated by applying a force normal to the surface of the fingers, and the weight of the object is simulated by applying forces tangential to the surface of the fingers. Slip is simulated by a variation of tangential forces.

Advantageously, the surface is supported by support means that are elastically deformable in the displacement direction(s), simply providing the one or two required degrees in translation and forming means of returning to the equilibrium position of the surface.

The subject-matter of this invention is then a system for simulation of a contact with a surface by tactile stimulation comprising a stimulation surface that will come into contact with an area of the user's skin, said system comprising means of displacing the stimulation surface along at least one first direction approximately tangent to the area of the skin, said displacement means being controlled as a function of the simulation to be generated, in which said displacement means are electromagnetic actuators.

Very advantageously, means of displacing the stimulation surface are also capable of displacing the stimulation surface along a second direction orthogonal to the first direction, and approximately tangent to the skin area.

In one example embodiment, the means of displacing the stimulation surface comprise three electromagnetic actuators arranged on a circle, distributed around a mobile element supporting the stimulation surface at 120° from each other.

In another example embodiment, the means of displacing the stimulation surface comprise four electromagnetic actuators, two actuators being placed along the first direction of displacement on each side of a mobile element supporting the stimulation surface and two actuators being arranged along the second displacement direction on each side of the mobile element supporting the stimulation surface.

Each electromagnetic actuator may comprise a solenoid and a core around which the solenoid is placed, the core being provided with a free face delimiting an air gap with a face of said mobile element. In one advantageous example, the section of the cores reduces along the direction of the mobile element. Faces delimiting the air gap of each of the electromagnetic actuators may advantageously be inclined relative to the plane defined by the first and second displacement directions, for example by an angle of 25°.

In another example embodiment, the stimulation surface can move along a third direction orthogonal to the first and second directions, said system comprising means of displacement of said stimulation surface along said third direction. The means of displacement along the third direction may advantageously be coincident with the means of displacement along the first and second directions.

For example, the stimulation surface may comprise a roughness with an average amplitude of less than or equal to 100 μm.

The simulation system according to this invention may comprise a chassis and means of supporting the stimulation surface, said support means being elastically deformable along at least one displacement direction so as to enable displacement of the stimulation surface along said direction and to return said stimulation surface into an equilibrium position.

In one embodiment, the support means are inserted between the chassis and the mobile element. For example, the support means comprise at least three elastically deformable rods, said rods connecting the mobile element and the chassis of the system. The rods may be made of polyurethane or elastomer, for example silicone.

In another example embodiment, the support means comprise at least one first hollow cylindrical element with a rectangular cross-section and longitudinal axis aligned with the first direction.

The system according to the invention may comprise a second hollow cylindrical element with a rectangular cross-section in which the longitudinal axis is in line with the second direction and is superposed onto the first element and is fixed to it.

In another embodiment, the support means are arranged between the mobile element and the stimulation surface, the mobile element being suspended from the support means and the stimulation surface being supported by support means.

In this embodiment, the support means may comprise a plate fixed on its periphery to the chassis and comprising cut outs at its centre delimiting a central zone suspended by beams, the mobile element and the stimulation surface being fixed to said plate at said suspended zone.

According to another characteristic, each electromagnetic actuator comprises a solenoid controlled by a transconductance amplifier.

The position of the stimulation surface is advantageously determined by the current applied to said solenoids.

Another purpose of this invention is a virtual reality system comprising at least one simulation system according to this invention.

The system may be portable and may be designed to be fixed on an area of the skin, such that the area of the skin can move in space and that the stimulation surface remains in contact with said area of skin.

The virtual reality system according to the invention may advantageously comprise at least one position sensor associated with the simulation system in order to determine the position of the area of the skin in space relative to the surface to be simulated.

The virtual reality system according to the invention can stimulate the digital pulp of fingers, and comprises systems for each finger in a hand and forming a glove.

The means generating simulation instructions are for example formed by a physical virtual reality simulation engine.

Another subject-matter of this invention is a tactile control system comprising at least one system according to this invention, said system for example being a touch screen or touch pad.

Another subject-matter of this invention is a method of controlling a virtual reality system according to this invention, said method comprising:

A—the step to measure the position of the skin area equipped with the 3-d simulation system, B—the step to apply a force amplitude adapted by actuator control to said area of skin, said adapted force amplitude being determined from a previously determined roughness profile, said roughness profile relating a given force amplitude to every position of the skin area on the surface to be simulated.

The roughness profile may for example be determined by:

moving a skin area on the real surface for which the roughness profile is to be made, measuring the amplitude of the force applied to said skin area by said real surface at each position, relating the measured force amplitude to each position.

BRIEF DESCRIPTION OF THE DRAWINGS

This invention will be better understood after reading the description given below and the appended drawings in which:

FIG. 8 is a perspective view of another example of a system according to the first embodiment of this invention, from which two actuators have been removed, FIG. 9 is a longitudinal sectional view of an example of a system according to the second embodiment of this invention.

DETAILED PRESENTATION OF EMBODIMENTS OF THE INVENTION

Figure 1:
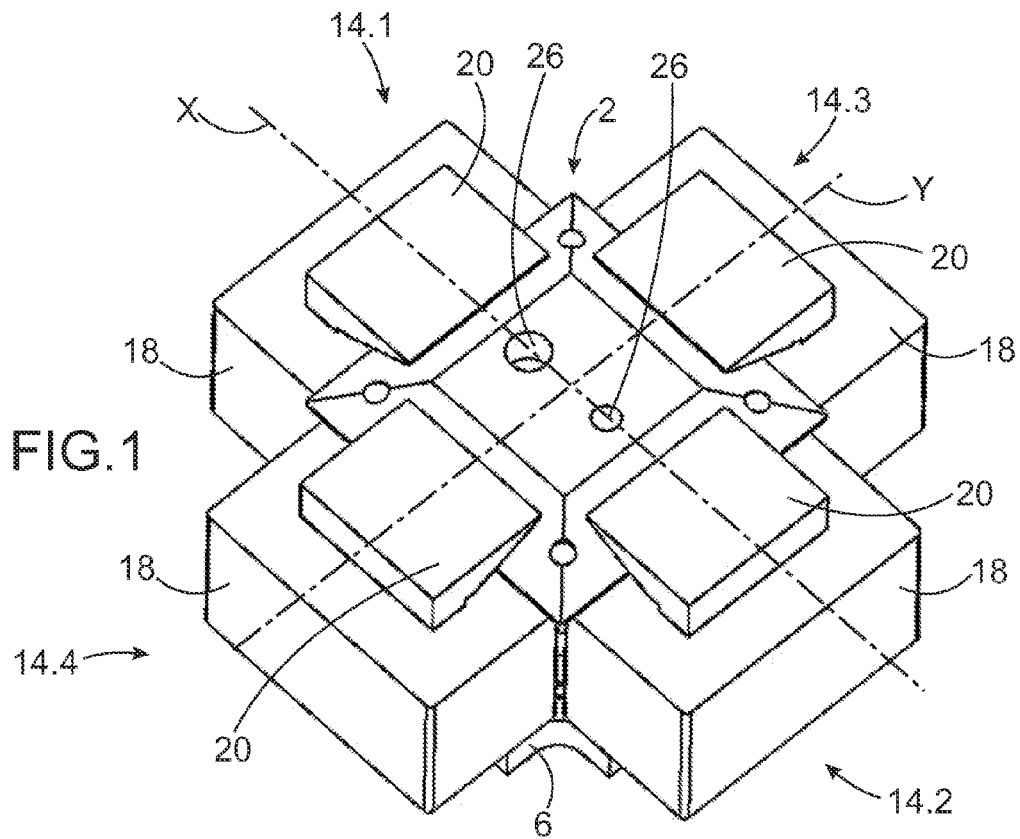
FIG. 1 is an isometric perspective view of an example embodiment of a simulation system according to a first embodiment of this invention.

In the following description, the simulation system according to the invention is described particularly to stimulate the digital pulp of a finger. However, obviously this invention could be applied to any area of the user's skin In the different embodiments and examples, the same references will be used to refer to elements with the same function and with approximately the same form.

FIGS. 1 to 4 show an example embodiment of a roughness simulation system by tactile stimulation according to a first embodiment of this invention.

The simulation system comprises an approximately plane element 2 free to move relative to the chassis 6 and means of displacing the mobile element 2 along at least two orthogonal axes X, Y and contained in the plane of the mobile element 2. The system is mounted in a housing 7 provided with a top opening. A platform 4 placed at this opening is fixed in movement to the mobile element 2 at least along the X and Y directions, the platform 4 is provided with a surface 4.1 that will come into contact with an area of the skin to be stimulated. Therefore the surface 4.1 is free to move in a plane parallel to the XY plane.

For example, the surface for a finger may be 10 mm×10 mm. It may be larger in touch pad or touch screen type applications. In the example shown, the chassis 6 comprises a plane base, the mobile element 2 is capable of moving parallel to the chassis 6.

The surface 4.1 of the platform 4 may be smooth or slightly rough. If the surface 4.1 is rough, the roughness must be such that the user does not feel it when there is no relative displacement between the skin and the surface 4.1. For example, the average amplitude of the roughness may be of the order of 100 μm, which corresponds to Ra 63.

In the example shown and advantageously, the mobile element 2 is supported by elastically deformable support means along the X and Y axes over the travel distance of the mobile element.

Figure 2:
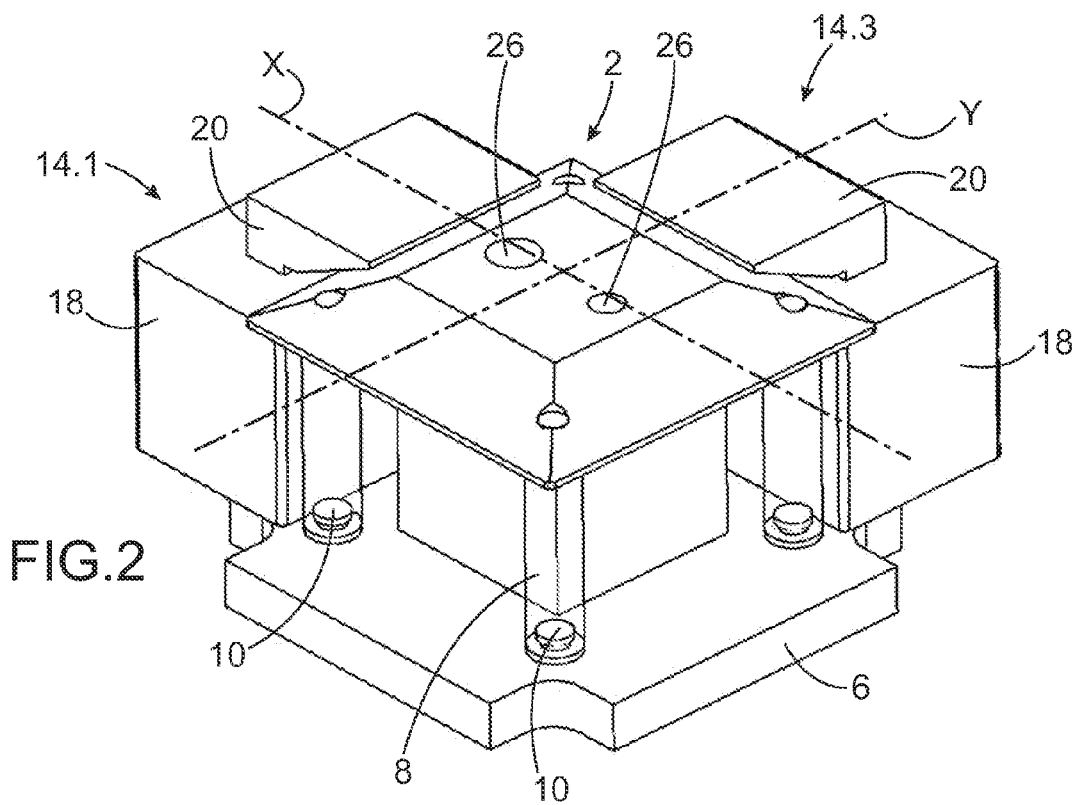
FIG. 2 is a perspective view of the system in FIG. 1 in which two actuators have been removed.
Figure 3:
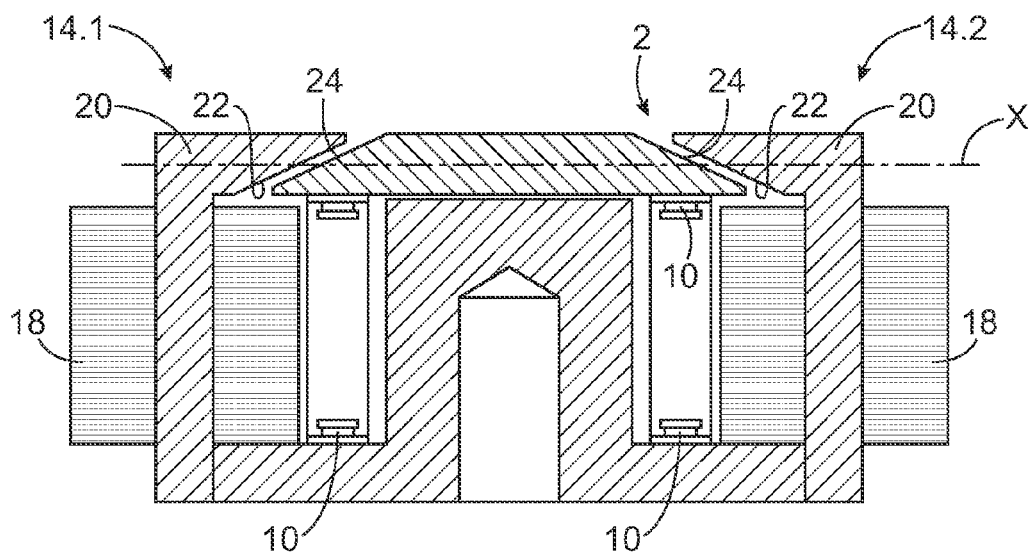
FIG. 3 is a cross-sectional view of the system in FIG. 1, along a plane containing the X-axis and normal to the Y-axis.

In this example, the support means are formed by several elastically deformable rods 8 extending between the chassis and the mobile element, and visible more particularly in FIGS. 2 and 3. In this example, there are four rods 8 and the mobile element 2 is supported on one end of these rods opposite the end fixed in the chassis. The rods 8 also form means of returning the mobile element 2 into its central position.

In the particular example shown, the rods 8 are solid. The chassis 6 comprises pins 10 projecting from the surface facing element 2 and element 2 also comprises pins 12 projecting from its surface facing the chassis. Each pin 10 of the chassis 6 is in line with a pin 12 of element 2 along an axis perpendicular to the chassis and the element. When the rods 8 are installed, the pins 10 of the chassis 6 and the pins 12 of the mobile element 2 are fixed to the ends of the rods. For example, the material from which the rods are made is inserted moulded on the pins 10, 12, so that each assembly is stiffened. The pins guide the platform 2 in translation along the X and Y axes preventing the platform 2 from coming into contact with the chassis 6. Obviously, any other type of assembly lies within the framework of this invention.

The rods are loaded in bending.

The rods may for example be made of polyurethane, which gives them very good elasticity in bending. As a variant, the rods 8 may be made of an elastomer, for example silicone.

As a variant, the rods could be replaced by helical springs with joined turns.

Due to their flexibility, the rods, and more generally the elastically deformable support means, provide an elastic return effect to bring the platform into its equilibrium position so that the system can be controlled in open loop, because there is no need to control the position of the platform.

Alternately, the elastic return could be replaced or extended by a conventional type guide system and means of determining the position of the platform.

The system also comprises means of moving the mobile element 2 along the X and Y axes. The means of moving the mobile element 2 are formed by electromagnetic actuators 14.1, 14.2, 14.3, 14.4. In the example shown, the system comprises four electromagnetic actuators. One pair of actuators 14.1, 14.2 is arranged on the X axis and a pair of actuators 14.3, 14.4 is arranged on the Y axis.

For example, the actuators can provide a high stimulation frequency, for example between 0 and 1200 Hz.

Actuators 14.1, 14.2 are arranged on each side of the mobile element 4 so that each acts on the element 2 along an opposite direction along the X axis.

Actuators 14.3, 14.4 are arranged on each side of the mobile element 4 such that each acts on the element 2 along an opposite direction along the Y axis.

As can be seen particularly in FIG. 3, each actuator comprises a solenoid 18 and a magnetic circuit. The magnetic circuit is partly formed by the chassis, the mobile element 2 and a core 20 around which the solenoid 18 is placed. In the example shown, the axis of the solenoid 18 is perpendicular to the plane of the chassis 6, but this configuration is in no way limitative. Therefore the chassis forming part of the magnetic circuit is made of a magnetic material.

The chassis comprises a protuberance at its centre located between the four rods 8 and under the element 2 enclosing the magnetic circuit.

Each core 20 comprises a surface 22 facing a surface 24 of the mobile element 2 on which it applies an attraction force so as to displace the mobile element 2 towards the core 18.

In the example shown and in a particularly advantageous manner, the surfaces 22 and 24 of the cores and the mobile element 2 are bevelled, the area of these surfaces is thus increased which enables better distribution of the force as a function of the position. The angle of inclination of the surfaces 22, 24 relative to the plane defined by the X and Y axes may for example be of the order of 25°.

In the example shown, the mobile element 2 is in the form a pyramid with a truncated apex. The truncated apex forms a plane support for the platform 4. Each of the inclined sides forms an interaction surface 24. The cores 20 and the surfaces 22 are made so as to be parallel to the surfaces 24. Each pair of surfaces 22, 24 defines an air gap in which electromagnetic forces are generated.

In the example shown, the apex is perforated by two holes 26 that will receive pins projecting from the surface of the platform 4 opposite the surface 4.1. Cooperation between the holes and the pins fixes the platform 4 and the element 2 along the X and Y axes. Obviously, the arrangement of holes and pins could be inverted. For example pins are force fitted into the platform 2, thus fixing it.

As a variant, the platform 4 may be fixed on the mobile element 2 by gluing, screwing and/or by clips.

This example embodiment is not limitative.

Furthermore, actuators in which interaction surfaces are contained in planes perpendicular to the plane defined by the X and Y axes are within the scope of this invention.

By alternately actuating actuators 14.1 to 14.4, it is quite possible to move the element 2 towards any position in the XY plane, and thus displace the surface 4.1.

In another example embodiment, the system comprises three actuators arranged on a circle at 120° from each other. Displacement along the X or the Y direction is then obtained by a vector sum of the forces applied by each of the actuators. In this example, the mobile element 2 may for example be in the form of a disk with a bevelled edge.

The device may be powered using different techniques.

In one example embodiment, the solenoids 18 are voltage controlled by applying a controlled voltage and allowing the current to vary using a conventional amplifier. The pass band of the device is then the same as the pass band of the RL circuit (formed by the resistance and the inductance of the solenoid).

In another example embodiment, the solenoids are current controlled which increases the pass band. Thus the voltage at the solenoid terminals will be adjusted such that the current passing through is equal to the set value. The pass band of this system will be limited by the maximum voltage that the transconductance amplifier can output.

The use of electromagnetic actuators also has the advantage that there is no need for any sensors to measure the displacement of the mobile element 2, because the displacement can be deduced from the current applied to the solenoids. The inductance of the solenoid depends on the position of the platform 2, this inductance can then be deduced from the position of the mobile element 2 and the platform 4.

The surface 4.1 is displaced so as to generate high stimulation frequencies, advantageously with a pass band of 0 to 1200 Hz, to retranscribe dynamic touch interactions.

Displacement of the surface 4.1 in a plane parallel to the XY plane can then simulate a surface roughness or a surface texture.

Advantageously, the system according to the invention can also be used to perform simulations by indentation by displacement of the surface 4 along an axis Z orthogonal to the X and Y axes in the direction of the skin area. Very advantageously, this displacement can be obtained directly with the system in FIGS. 1 to 4 by simultaneously applying power to the four solenoids 18.

It would be possible to envisage using one or several actuators dedicated to displacement along the Z axis. This can be a piezoelectric actuator, the travel distance amplification means are then advantageously provided between the actuator and the element 2. An actuator using Laplace forces could also be used, this type of actuator has the advantage of providing a constant force over the entire travel distance.

A position sensor is provided along the X axis, in the case in which the displacement means along the Z axis are not electromagnetic actuators.

In the case of an onboard virtual reality system, the system may comprise position sensors to determine the position of the finger in the space and the velocity of the displacement of the finger. The sensation felt by the user depends on the position on the virtual surface and the displacement velocity relative to the surface.

FIG. 8 shows another example embodiment of the system according to the first embodiment of this invention.

The system in FIG. 8 is very similar to the system in FIGS. 1 to 4, the only difference being that the rods 8 are replaced by two elements 28, 30 forming deformable parallelograms.

The flexible support of the mobile part 2 enabling two degrees of freedom in translation then comprises a first hollow cylindrical element 28 with a longitudinal axis aligned with the Y axis and a second hollow cylindrical element 30 with a longitudinal axis aligned with the X axis. The first and second elements 28, 30 are elastically deformable along the X and Y axes respectively and form deformable parallelograms.

The two elements 28, 30 are superposed and inserted between the chassis and the mobile element 2. The first element 28 is fixed to the chassis for example by screws or force fitted pins, and the second element is fixed to the mobile part 2.

The elements 28, 30 are for example made of a plastic material such as polyoxymethylene, Delrin® or metal.

Figure 10:
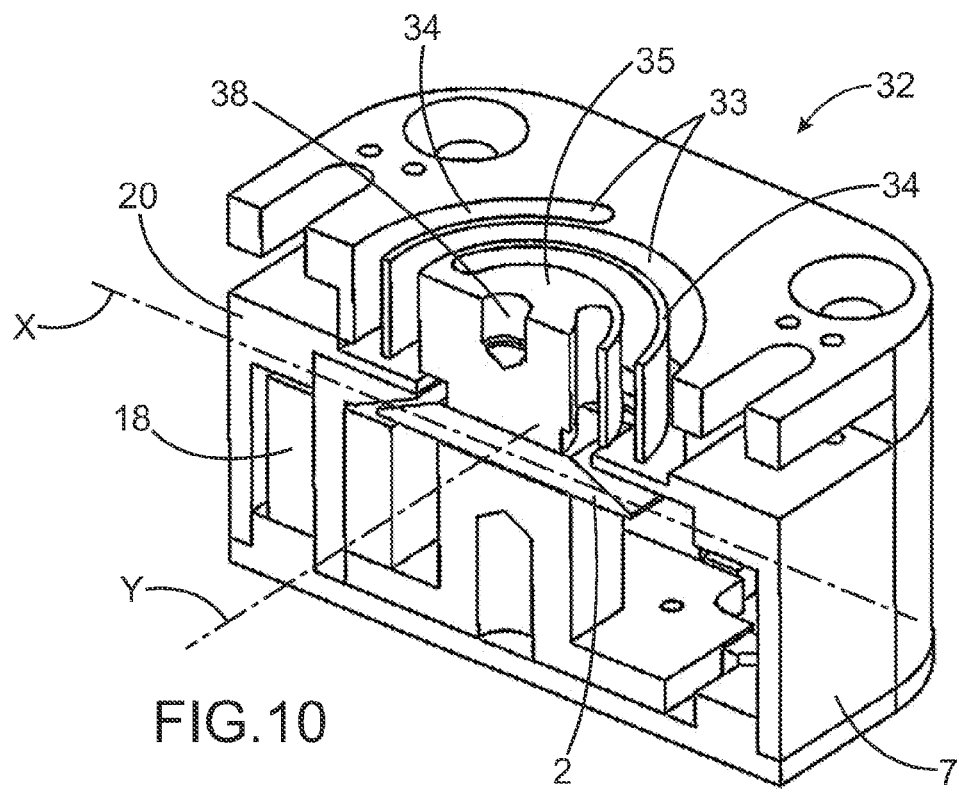
FIG. 10 is a perspective sectional view of the system in FIG. 9 from which the stimulation platform and an actuator have been removed.
Figure 11:
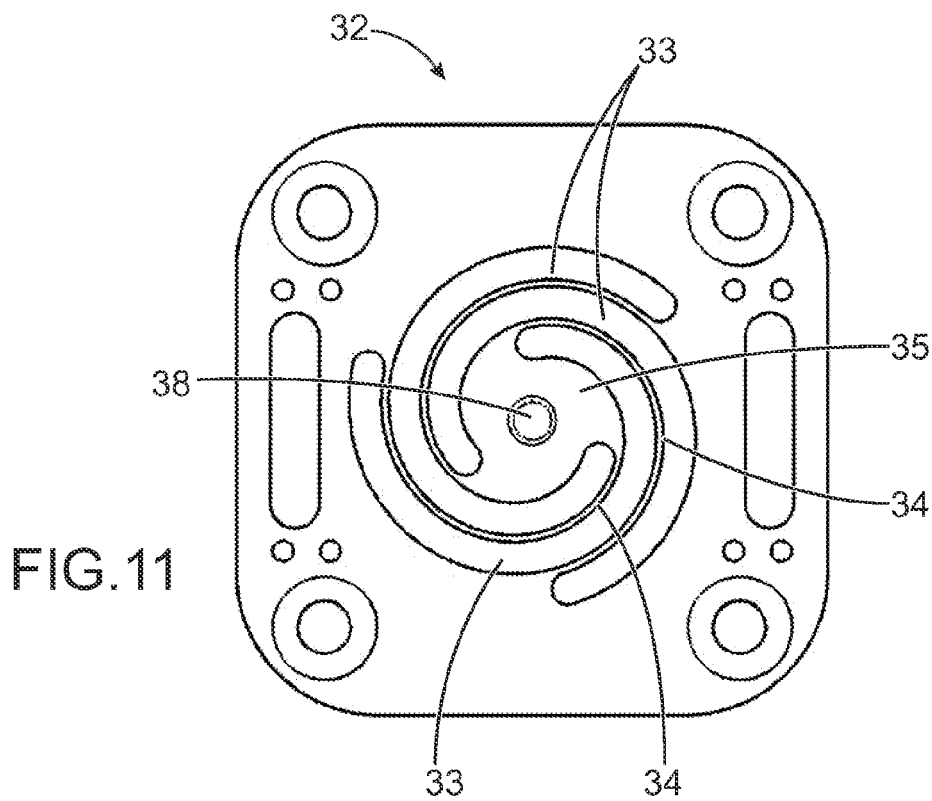
FIG. 11 is a top view of a part of the system in FIG. 9.

FIGS. 9 to 11 show an example embodiment of the system according to a second embodiment of this invention.

The system in FIGS. 9 to 11 is different from systems according to the first embodiment in that the flexible support means that enable translations along the two X and Y directions and control the return to the equilibrium position are inserted between the platform 4 and the mobile surface 2.

In this example embodiment, the system comprises a support formed by a plate 32 fixed at its lateral ends to the housing 7, for example by screws at the four corners.

The plate 32 is cut out such that the cut outs 33 provide two degrees of freedom in translation to the platform 4 and control the return to the equilibrium position.

FIG. 11 shows an example of cut outs 33 performing these functions. The cut outs 33 are portions of spirals, there are three in the example shown, that are wound around each other. The three portions of the spirals 33 delimit curved shaped beams 34 from the ends of which a plate 35 is suspended.

The platform 4 is fixed to the suspended plate 35, for example the platform comprises a pin 36 projecting from its lower face, that is force fitted into a reaming 38 provided in the upper face of the suspended plate 35, at the centre of it.

The suspended plate is fixed in movement to the mobile part 2, for example by force fitting, gluing or screwing.

Since the mobile part 2 and the suspended plate 35 are fixed to each other, the mobile part 2 is also suspended by beams 34 above the central protuberance of the chassis.

For example, the plate may be made of a plastic material such as polyoxymethylene such as Delrin®, or metal.

The use of a plastic material has the advantage that it allows a larger travel distance because it is usually relatively deformable. Metal has a lesser damping effect because it is stiffer, and therefore energy losses are small.

Figure 12:
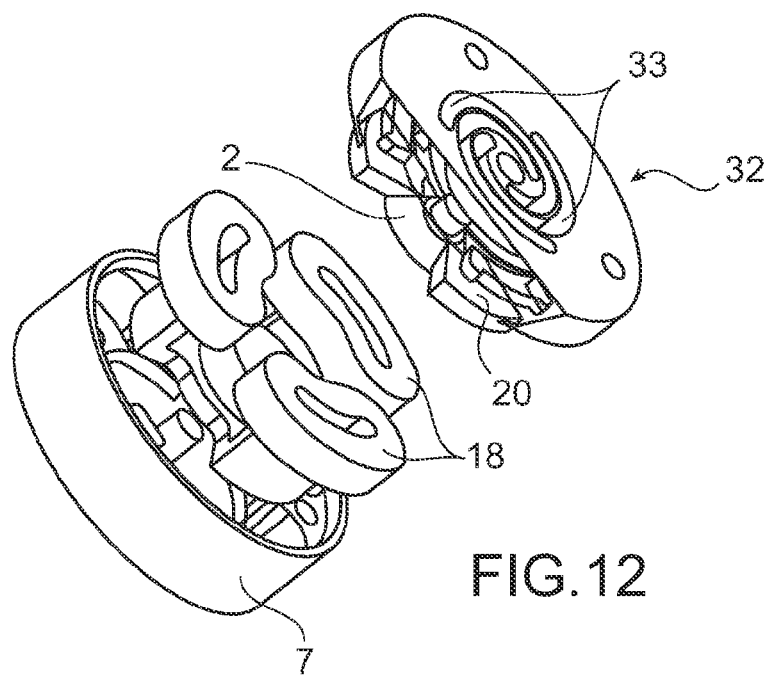
FIG. 12 is an exploded perspective view of another example of the system according to the second embodiment of this invention.
Figure 13:
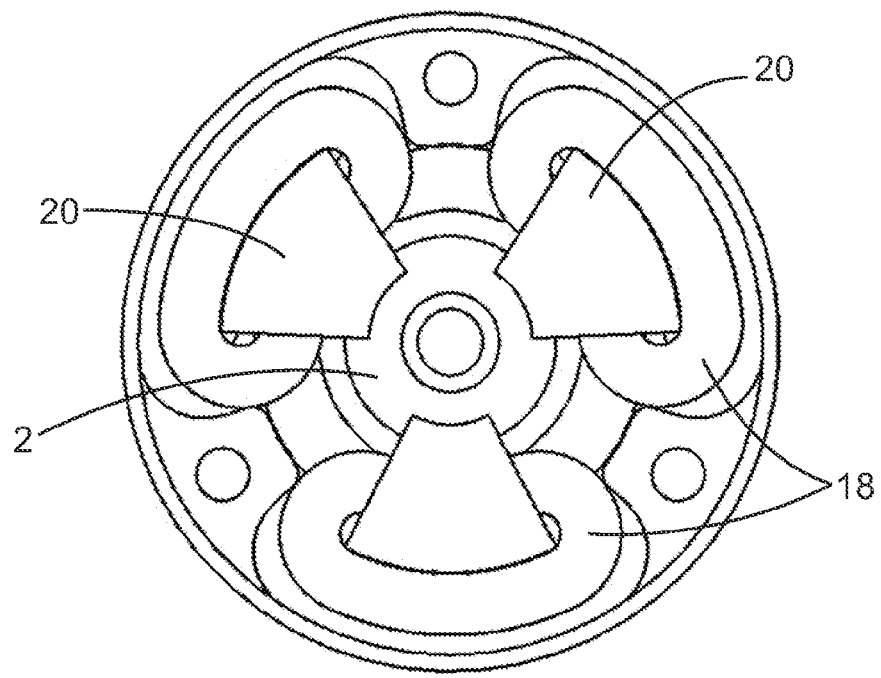
FIG. 13 is a top view of the inside of the system in FIG. 12.

FIGS. 12 and 13 show another example embodiment of the system according to the second embodiment of this invention, in which there are three actuators distributed at 120° from each other. The solenoids are advantageously bean-shaped to improve fit in a housing having the shape of cylinder of revolution.

Advantageously, a top view of the cores 20 shows the shape of an isosceles trapeze in which the small base forms the air gap with the mobile part. The cross-section of the cores then becomes smaller towards the mobile part, which causes a field concentration effect.

As a variant, it would be quite possible to have a system with a single degree of freedom in lateral tension comprising two actuators.

Obviously, the support means could be made by mechanical connections with elements articulated to each other. For example, they could be deformable parallelograms formed by rods articulated to each other by pivot connections. Platform position detection means would then preferably be used. The support means could then be mechanically deformable, i.e. by articulation means.

Figure 7:
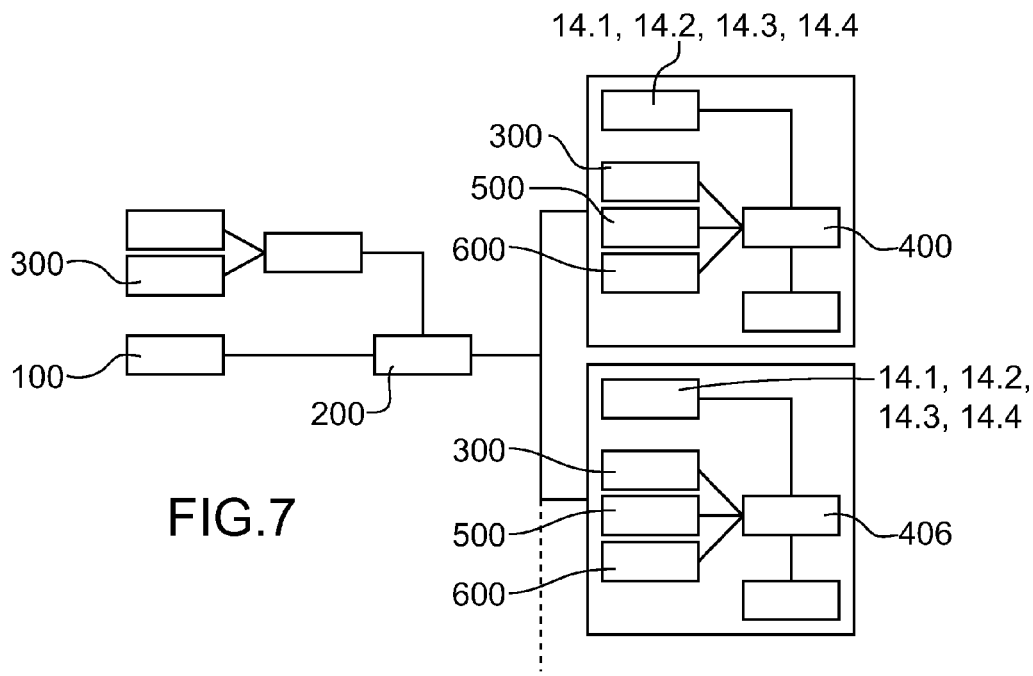
FIG. 7 is an example of an electronic control diagram of a simulation system according to this invention.

FIG. 7 shows an example diagram of the electronic control of the system applied to virtual reality mounted on at least two fingers.

The three stimulation axes are controlled according to set values output by the physical virtual reality simulation engine 100. A virtual reality engine is a real time simulation of a virtual mechanical environment. It uses information about the position of the fingers as input data and calculates interaction forces as a function of the contact with a virtual object. The virtual engine uses previously determined roughness profiles that will be described later.

The simulation system comprises a coordinator 200, for example in the form of an electronic board, coordinating data received from the physical engine 100, the charge of a system power supply battery 300 and set values for each stimulation device. Advantageously, the data are transmitted be a wireless link. The battery charge is monitored to prevent it from being excessively discharged.

The system comprises a micro-controller 400 that will control motors according to orders received by the coordinator 200, and regulates the electromagnetic actuators 14.1, 14.2, 14.3, 14.3 relative to the set value and information provided.

Furthermore, the micro-controller 400 can interpolate finger movements from information provided by the accelerometer 500.

Advantageously, a force sensor 600, for example a capacitive sensor, may be provided to control the force applied by the motors on the fingers. This sensor is arranged between the mobile element and the skin and measures normal and tangential interactions. Obviously, the system according to this invention may be adapted to stimulate any area on the skin, and not only the fingers. Furthermore, it would be possible to have a surface acting on several fingers at the same time.

We will now explain operation of the system according to this invention starting from the system shown in FIGS. 1 to 4 in the framework of a virtual reality system, the system being fixed to the end of a finger.

Figure 4:
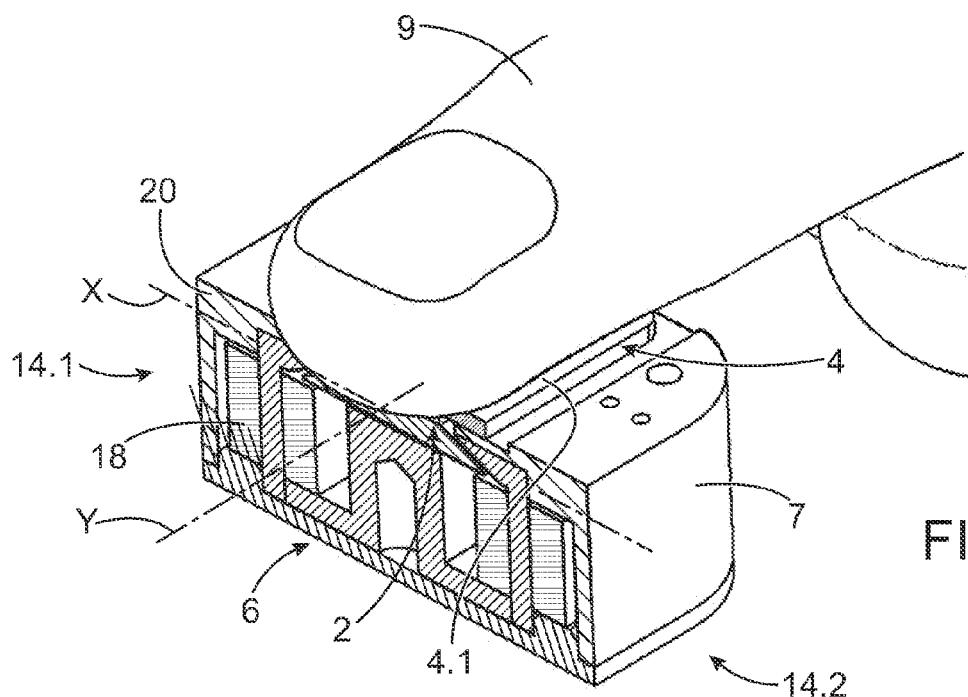
FIG. 4 is a view identical to FIG. 3, the system being installed in a housing and shown in a simulation situation, with a finger in contact with it.

The user fixes the surface 4 on the digital pulp of his finger 4 as shown in FIG. 4.

When it is required to generate a roughness stimulation, the actuators are actuated according to a diagram corresponding to a roughness profile of a given object.

For example, to make the roughness profile of a surface for which the roughness is to be simulated, the amplitude of the tangential force applied to the finger is measured for each position of the finger on the surface to be simulated. This measurement takes place when the finger is moved on the surface. The displacement velocity of the finger is taken into account by position measurements.

During the simulation, the position of the finger and the system are detected, the system being fitted with position sensors to determine the position relative to the virtual surface. The amplitude of the force to be applied is then related to the position of the finger using the previously determined roughness profile, and the actuators are actuated such that they move the mobile element 2 and the platform 4 on the basis of the previously determined roughness profile and apply the required force amplitude.

Since the stimulation frequency of the actuators is high, they can refresh the stimulation to give a realistic simulation.

Figure 5:
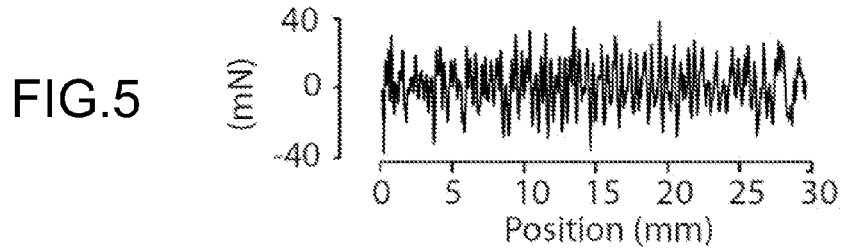
FIG. 5 shows the reproducible roughness profile in the 3-d domain for control of the system according to this invention.

FIG. 5 shows an example of a roughness profile reproducible in the 3-d domain by the system according to this invention. FIG. 5 shows the amplitude of the tangential force in mN as a function of the position in mm. This roughness profile corresponds to a displacement along a single dimension.

The profile will be made along two directions for a displacement on a surface. For a finger, the variation in friction of the finger (and therefore the tangential force) is the roughness perception index.

The mobile element 2 is then attracted in sequence towards the cores 20, the surface 4.1 then moves relative to the surface of the digital pulp of the finger, stimulating it and creating a simulation of the roughness of the surface of the given object.

Figure 6A:
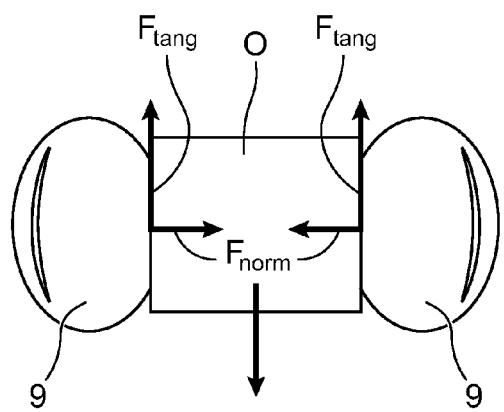
FIGS. 6A and 6B are graphic views of forces to be simulated in the case of gripping an object and the case of sliding the finger on a surface respectively.

If it is required to simulate gripping of an object O by at least two fingers as shown diagrammatically in FIG. 6A, each finger is fitted with a system according to the invention. In this case, the systems comprise means of fixing the systems to the fingers so that the user can move his fingers while remaining in contact with the surfaces 4.1.

Figure 6B:
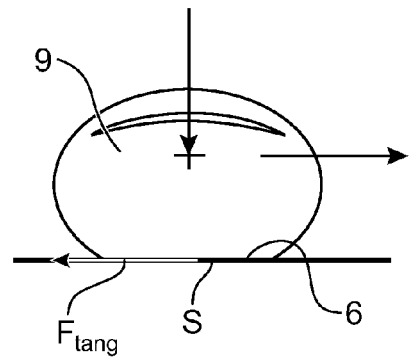

Gripping is simulated by generating forces $F_{normal}$ normal to the digital pulp of the fingers simulating the gripping force and tangential forces $F_{tang}$ along a direction simulating the weight of the object. FIG. 6B contains a diagrammatic view of the force in the case of a finger 9 slipping on a surface, the slip is simulated by the variation with time of tangential forces $F_{tang}$ applied to the digital pulp of the finger along the direction of displacement of the finger.

In the special case of stimulation of the fingers, it could be envisaged to make a glove fitted with systems for each of the fingers.

Due to the high actuation frequency of actuators, the system according to this invention provides a high stimulation speed, so that the entire tactile pass band can be covered thus offering realistic simulation.

A dynamic reaction with the outside environment can be simulated due to stimulations by shear in two directions and by indentation.

Furthermore, the system provides a realistic interaction without the use of tactile metaphors.

If at least two fingers in a hand are fitted with a system according to this invention, it will be very easy to simulate gripping of a virtual object. Due to stimulation by indentation, the user has the sensation of squeezing an object at the ends of his fingers and due to stimulation by shear, the user has the impression of feeling the weight of the object.

The system described is adapted to stimulation of the digital pulp of a finger, but it would possible to envisage making a plurality of systems forming a glove in order to stimulate the digital pulp of several fingers, for example to simulate gripping of an object with all the fingers in one hand, or with two hands.

The system according to this invention is particularly suitable for virtual reality systems. The system stimulates the finger or any area of the skin in correlation with information provided by the virtual reality system with high fidelity.

For example, the system according to the invention may be used for video games, interactive simulations, a computer mouse, a touch pad/touch screen or for example a steering wheel. In the case of a touch screen, the screen forms the platform 4.

The invention claimed is:

1. A system for simulation of a contact with a surface by tactile stimulation comprising:
a stimulation surface that will come into contact with an area of a user's skin, said stimulation surface being attached to a mobile element, said system comprising means of displacing the stimulation surface along at least one first displacement direction approximately tangent to the area of the user's skin, said means of displacing being controlled as a function of the simulation to be generated, wherein said means of displacing are electromagnetic actuators and wherein each of the electromagnetic actuators comprises a solenoid and a core around which the solenoid is placed, the core comprising at least one face surrounded by the solenoid and a free face delimiting an air gap with respect to a face of said mobile element.

2. The system for simulation according to claim 1, wherein the means of displacing the stimulation surface are also capable of displacing the stimulation surface along a second displacement direction orthogonal to the first displacement direction and approximately tangent to the area of the user's skin.

3. The system for simulation according to claim 1 comprising three of the electromagnetic actuators arranged on a circle and distributed around the mobile element at 120° from each other.

4. The system for simulation according to claim 1 comprising four of the electromagnetic actuators, two of the four electromagnetic actuators being arranged along the first displacement direction on each side of the mobile element and the other two of the four electromagnetic actuators being arranged along the second displacement direction on each side of the mobile element.

5. The system for simulation according to claim 1, wherein a cross-section of the electromagnetic actuators reduces along a direction of the mobile element.

6. The system for simulation according to claim 2, wherein the free face delimiting the air gap of each of the electromagnetic actuators is inclined relative to a plane defined by the first displacement direction and the second displacement direction.

7. The system for simulation according to claim 2, wherein the stimulation surface can move along a third displacement direction orthogonal to the first displacement direction and the second displacement direction, said system comprising means of displacement of said stimulation surface along said third displacement direction.

8. The system for simulation according to claim 7, wherein the means of displacement along the third displacement direction are coincident with the means of displacing along the first displacement direction and the second displacement direction.

9. The system for simulation according to claim 1, wherein the stimulation surface comprises a roughness with an average amplitude of less than or equal to 100 μm.

10. The system for simulation according to claim 1 comprising a chassis and supports of the stimulation surface, said supports being elastically deformable along at least one displacement direction so as to enable displacement of the stimulation surface along said at least one displacement direction and to return said stimulation surface into an equilibrium position.

11. The system for simulation according to claim 10 comprising three of the electromagnetic actuators arranged on a circle and distributed around the mobile element at 120° from each other, wherein the supports are inserted between the chassis and the mobile element.

12. The system for simulation according to claim 11, wherein the supports comprise at least three elastically deformable rods, said rods connecting the mobile element and the chassis.

13. The system for simulation according to claim 12, wherein the rods are made of polyurethane or elastomer.

14. The system for simulation according to claim 10, wherein the supports comprise at least one first hollow cylindrical element with a rectangular cross-section and longitudinal axis aligned with the first displacement direction.

15. The system for simulation according to claim 14, wherein the means of displacing the stimulation surface are also capable of displacing the stimulation surface along a second displacement direction orthogonal to the first displacement direction and approximately tangent to the area of the user's skin, and wherein the system comprises a second hollow cylindrical element with a rectangular cross-section and longitudinal axis aligned with the second displacement direction, and wherein the second hollow cylindrical element is superposed onto and fixed to the first hollow cylindrical element.

16. The system for simulation according to claim 10 comprising three of the electromagnetic actuators arranged on a circle and distributed around a mobile element at 120° from each other, wherein the supports are arranged between the mobile element and the stimulation surface, the mobile element being suspended from the supports and the stimulation surface being supported by support means.

17. The system for simulation according to claim 16, wherein the support means comprise a plate fixed on its periphery to the chassis and comprising cut outs at its center delimiting a central zone suspended by beams, the mobile element and the stimulation surface being fixed to said plate at said central zone.

18. The system for simulation according to claim 1 wherein the solenoid of each electromagnetic actuator is controlled by a transconductance amplifier.

19. The system for simulation according to claim 1, wherein a position of the stimulation surface is determined by a current applied to said solenoid.

20. A virtual reality system comprising at least one system for simulation according to claim 1.

21. The virtual reality system according to claim 20, said virtual reality system being portable and designed to be fixed on an area of skin, such that the area of skin can move in space and such that the stimulation surface remains in contact with said area of skin.

22. The virtual reality system according to claim 21 comprising at least one position sensor associated with the system for simulation in order to determine a position of the area of skin in space relative to the surface to be simulated.

23. The virtual reality system according to claim 20, being designed to stimulate a digital pulp of fingers, comprising systems for each finger in a hand and forming a glove.

24. The virtual reality system according to claim 20, wherein means generating simulation instructions are formed by a physical virtual reality simulation engine.

25. A tactile control system comprising at least one system for simulation according to claim 1.

26. A method of controlling the virtual reality system according to claim 22, said method comprising the steps of:
measuring the position of the area of skin equipped with the system for simulation,
applying a force amplitude adapted by actuator control to said area of skin, said adapted force amplitude being determined from a previously determined roughness profile, said previously determined roughness profile relating a given force amplitude to every position of the area of skin on the surface to be simulated.

27. The method according to claim 26, wherein the previously determined roughness profile is determined by:
moving the area of skin on a real surface for which the previously determined roughness profile is to be made,
measuring the force amplitude applied to said area of skin by said real surface at each position, and
relating the measured force amplitude to each position.

28. The system for simulation according to claim 10, wherein the means of displacing the stimulation surface are also capable of displacing the stimulation surface along a second displacement direction orthogonal to the first displacement direction and approximately tangent to the area of the user's skin, and wherein the system comprises four of the electromagnetic actuators, two of the four electromagnetic actuators being placed along the first displacement direction on each side of the mobile element and the other two of the four electromagnetic actuators being arranged along the second displacement direction on each side of the mobile element, wherein the supports are inserted between the chassis and the mobile element.

29. The system for simulation according to claim 28, wherein the supports comprise at least three elastically deformable rods, said rods connecting the mobile element and the chassis.

30. The system for simulation according to claim 29, wherein the rods are made of polyurethane or elastomer.

31. The system for simulation according to claim 10 comprising four of the electromagnetic actuators, two of the four electromagnetic actuators being arranged along the first displacement direction on each side of the mobile element and the other two of the four electromagnetic actuators being arranged along the second displacement direction on each side of the mobile element, wherein the supports are arranged between the mobile element and the stimulation surface, the mobile element being suspended from the supports and the stimulation surface being supported by support means.

32. The system according to claim 31, wherein the support means comprise a plate fixed on its periphery to the chassis and comprising cut outs at its centre delimiting a central zone suspended by beams, the mobile element and the stimulation surface being fixed to said plate at said central zone.

* * * * *